United States Patent [19]

Bühler et al.

[11] Patent Number: 4,582,509

[45] Date of Patent: Apr. 15, 1986

[54] MIXTURES OF MONOAZO DYESTUFFS

[75] Inventors: Ulrich Bühler, Alzenau; Manfred Hähnke, Kelkheim; Albert Bode, Schwalbach; Kurt Roth, Hofheim; Margarete Boos, Hattersheim, all of Fed. Rep. of Germany

[73] Assignee: Cassella Aktiengesellschaft, Frankfurt am Main, Fed. Rep. of Germany

[21] Appl. No.: 698,147

[22] Filed: Feb. 4, 1985

[30] Foreign Application Priority Data

Feb. 13, 1984 [DE] Fed. Rep. of Germany ....... 3405021

[51] Int. Cl.$^4$ .......................... D06P 3/82; C09B 29/08
[52] U.S. Cl. ............................................. 8/532; 8/639; 8/921; 8/922; 8/924; 534/588; 534/843
[58] Field of Search .................................... 8/639, 532

[56] References Cited

U.S. PATENT DOCUMENTS 3,821,195  6/1974  Putzis ................................. 534/850

FOREIGN PATENT DOCUMENTS 2030167  4/1980  United Kingdom .

Primary Examiner—A. Lionel Clingman
Attorney, Agent, or Firm—Connolly and Hutz

[57] ABSTRACT

The mixture of monoazo dyestuffs containing at least different individual dyestuffs of the formula

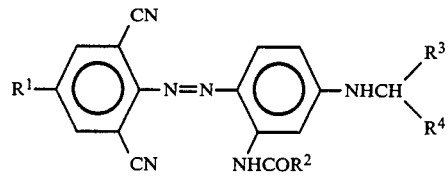

wherein
$R^1$ is alkyl of 1 to 6 carbon atoms, cyclopentyl, cyclohexyl, fluoro, chloro, bromo, alkoxy of 1 to 4 carbon atoms or trifluoromethyl,
$R^2$ is alkyl of 1 to 3 carbon atoms and
$R^3$ and $R^4$, independently of each other, are alkyl of 1 to 4 carbon atoms, is highly suitable for dyeing and printing hydrophobic materials.

15 Claims, No Drawings

MIXTURES OF MONOAZO DYESTUFFS

The invention relates to mixtures of monoazo dyestuffs, these mixtures being characterised in that they contain or consist of two or more different dyestuffs of the formula I

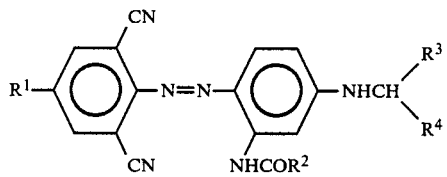

in which
$R^1$ denotes alkyl of 1 to 6 carbon atoms, cyclopentyl, cyclohexyl, fluorine, chlorine, bromine, alkoxy of 1 to 4 carbon atoms or trifluoromethyl,
$R^2$ denotes alkyl of 1 to 3 carbon atoms and
$R^3$ and $R^4$, independently of the other, each denote alkyl of 1 to 4 carbon atoms.

The invention also relates to a process for preparing the dyestuff mixtures and to their use for dyeing and printing synthetic hydrophobic materials.

Individual dyestuffs of the formula I in which $R^1$ is methyl, $R^2$ is lower alkyl, and $R^3$ and $R^4$ each stand for an alkyl group, and their use for dyeing synthetic textile materials are known from German Offenlegungsschrift No. 2,935,011.

It has now been found, surprisingly, that, in the dyeing and printing of hydrophobic synthetic materials, the dyestuff mixtures according to the invention are far superior to the comparable individual dyestuffs known from German Offenlegungsschrift No. 2,935,011, in particular when the mixtures contain two or more different individual dyestuffs of the formula I, in terms of dyeing properties and coloristic fastness properties. The individual dyestuffs which are contained in the dyestuff mixtures according to the invention and have the formula I
in which
$R^1$ denotes alkyl or 2 to 6 carbon atoms, cyclopentyl, cyclohexyl, fluorine, chlorine, bromine, alkoxy of 1 to 4 carbon atoms or trifluoromethyl,
$R^2$ denotes alkyl of 1 to 3 carbon atoms and
$R^3$ and $R^4$, independently of the other, each denote alkyl of 1 to 4 carbon atoms are new. They, their preparation and their use for dyeing and printing hydrophobic synthetic materials are likewise claimed within the scope of the present invention. The new individual dyestuffs are likewise superior to the known individual dyestuffs in terms of dyeing properties and coloristic fastness properties.

Examples of alkyl radicals which have 1 to 6 carbon atoms and can take the place of $R^1$ in the formula I are methyl, ethyl, propyl, isopropyl, n-butyl, isobutyl, sec.-butyl, tert.-butyl, n-pentyl, isopentyl and n-hexyl.

Examples of alkoxy radicals which have 1 to 4 carbon atoms and can take the place of $R^1$ in the formula I are methoxy, ethoxy, n-propoxy, isopropoxy, n-butoxy, isobutoxy, sec.-butoxy and tert.-butoxy.

The alkyl radicals which have 1 to 3 carbon atoms and can take the place of $R^2$ in the formula I are methyl, ethyl, n-propyl and isopropyl.

The alkyl radicals which have 1 to 4 carbon atoms and can take the place of $R^3$ and $R^4$ in the formula I are those mentioned for $R^2$ plus n-butyl, isobutyl, sec.-butyl and tert.-butyl.

Preferred dyestuff mixtures contain or consist of two or more individual dyestuffs of the formula I in which the $R^3$s stand for methyl or ethyl and the $R^4$s stand for alkyl of 1 to 3 carbon atoms and/or the $R^1$s stand for alkyl of 1 to 3 carbon atoms, trifluoromethyl, chlorine, bromine, methoxy or ethoxy.

Particularly preferred dyestuff mixtures contain or consist of two or more individual dyestuffs which have the formula I and in which $R^1$ denotes ethyl and in particular methyl and/or which differ at least as far as $R^2$ is concerned and/or of which at least one is a dyestuff where $R^2$=isopropyl, preferably n-propyl. Very particularly preferred dyestuff mixtures contain at least two individual dyestuffs of the formula I where $R^1$=methyl which differ as far as $R^2$ is concerned and of which one dyestuff has the meaning of n-propyl for $R^2$.

Preferred radicals for individual dyestuffs which have the formula I and are in accordance with the invention are:
$R^1$: n-propyl, isopropyl, in particular ethyl, chlorine, bromine, methoxy and ethoxy
$R^2$: ethyl and isopropyl, in particular n-propyl
$R^3$: methyl or ethyl and
$R^4$: alkyl of 1 to 3 carbon atoms.

In preferred individual dyestuffs of the formula I which are in accordance with the invention the substituents are preferred radicals; particularly preferred individual dyestuffs carry particularly preferred radicals.

The individual dyestuffs of the formula I are prepared by subjecting azo dyestuffs of the formula II

in which $R^1$, $R^2$, $R^3$ and $R^4$ are as defined above, X denotes cyano or halogen and Hal denotes a halogen atom, such as chlorine or in particular bromine, in a manner known per se, for example as described in German Offenlegungsschriften Nos. 1,809,920 and 1,809,921, British Pat. Nos. 1,184,825 and 1,125,685, German Auslegeschrift No. 1,544,563, German Offenlegungsschrift No. 2,310,745, German Auslegeschrift No. 2,456,495, German Auslegeschrift No. 2,610,675, German Offenlegungsschrift No. 2,724,116, German Offenlegungsschrift No. 2,724,117, German Offenlegungsschrift No. 2,834,137, German Offenlegungsschrift No. 2,341,109, U.S. Pat. No. 3,821,195, German Offenlegungsschrift No. 2,715,034 or German Offenlegungsschrift No. 2,134,896, to a nucleophilic replacement reaction in which the nucleophilic reagent is the cyanide ion $CN^-$.

The solvents for the replacement reaction are inert organic solvents, such as, for example, nitrobenzene or glycol or diglycol monomethyl ethyl or diglycol monoethyl ether or mixtures of these solvents with one another and with tertiary organic nitrogen bases, dipolar aprotic solvents, such as, for example, methylpyrrolidone, pyridine, dimethylformamide or dimethyl sulphoxide, dicyanodialkyl thioether, water or aqueous systems consisting of water and a water-immiscible organic solvent (such as, for example, nitrobenzene), preferably in the presence of a wetting agent or dispersant or their known phase transfer catalyst, or aqueous systems of water and a water-soluble, inert organic solvent, such as, for example, ethylene glycol or dimethylformamide.

The replacement reaction is also favoured by the presence of organic, basic nitrogen compounds, such as, for example, pyridine and pyridine bases.

The reaction temperatures are normally between 20° and 150° C.

The nucleophilic reagent $CN^-$ is added to the reaction in the form of an optionally complex metal cyanide, such as, for example, an alkali metal or alkaline earth metal cyanide, zinc cyanide, alkali metal cyanozincate or cyanoferrate, but preferably in the form of copper(I) cyanide or of a system which forms copper(I) cyanide. It has been found to be particularly suitable to use a combination of alkali metal cyanide and copper(I) cyanide; in this combination, the ratio of alkali metal salt and copper salt can vary within wide limits.

The practicable range for the alkali metal cyanide/copper(I) cyanide ratio is from 5:95 to 95:5. Even outside these limits the positive mutual influence of the components is still noticeable. It is of course also possible to replace the copper(I) cyanide in turn by a system which forms copper(I) cyanide, such as, for example, a combination of alkali metal cyanide with another copper salt, preferably a copper(I) salt, such as, for example, a copper(I) halide.

The dyestuffs of the formula (II) which are required for preparing the dyestuffs of the formula (I) can be prepared by coupling a diazonium compound of an aromatic amine of the general formula III

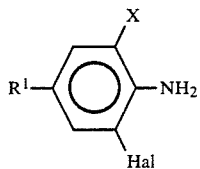
(III)

with a coupling component of the general formula IV

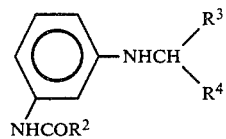
(IV)

in which $R^1$, $R^2$, $R^3$, $R^4$, X and Hal are as defined above.

The diazonium compounds of the amines of the general formula III are prepared in a manner known per se at temperatures of 0° to 40° C. by the action of nitrous acid or other systems which form nitrosonium ions in an acid aqueous medium, a lower alkanoic acid, such as, for example, formic acid, acetic acid or propionic acid or mixtures thereof, or an organic solvent.

The coupling likewise takes place in a manner known per se at temperatures of 0° to 40° C., preferably 0° to 25° C., by combining the resulting diazo solution with a solution of the coupling component in a suitable solvent, such as, for example, an alkanol of 1 to 4 carbon atoms, dimethylformamide, preferably in water acidified with sulphuric acid, hydrochloric acid or phosphoric acid, or an optionally water-containing lower alkanoic acid or a lower alkanoic acid mixture, in the presence or absence of an alkanol of limited miscibility with water. In some cases it can be advantageous to buffer the pH during the coupling, for example by adding sodium acetate. The coupling is complete after some hours, and the dyestuff of the formula II can be conventionally isolated and dried.

The required coupling components of the formula IV can be prepared by known methods from known commercial products.

The dyestuff mixtures according to the invention contain or consist of two or more dyestuffs of the formula I. In the dyestuff mixtures according to the invention the ratio of the various dyestuffs of the general formula I can vary within relatively wide limits. In general, the minimum proportion by weight of an individual dyestuff of the formula I is 10% and the maximum proportion by weight is 90%. In dyestuff mixtures which consist of only two dyestuffs of the general formula I the preferred ratio is 70:30 to 30:70, i.e. the proportion by weight of an individual dyestuff is preferably 30 to 70%.

The abovementioned weight proportions and weight ratios relate merely to that proportion of a dyestuff mixture according to the invention which consists of dyestuffs of the formula I. The dyestuff mixtures according to the invention can additionally contain other disperse dyestuffs, in particular red anthraquinone dyestuffs of the C.I. Disperse Red 60 type and/or standardising agents and/or auxiliaries.

In dyestuff mixtures according to the invention which, in addition to two or more individual dyestuffs of the formula I, also contain other dyestuffs, in particular anthraquinoid reds of the C.I. Disperse Red 60 type, i.e. dyestuffs which contain a 2-amino-4-hydroxyanthraquinone radical, such as, for example, C.I. Disperse Red 132 or C.I. Disperse Red 51, but in particular C.I. Disperse Red 60 itself, and can, if desired, also contain auxiliaries and/or standardising agents, the weight ratio relative to the total amount of dyestuff can amount to 10 to 90% by weight for the dyestuffs of the formula I and 90 to 10% by weight for the other, in particular anthraquinoid red dyestuff.

The dyestuff mixtures according to the invention can be in powder or paste form. The pulverulent dyestuff preparations normally have a dyestuff content of 30 to 50% by weight. The rest is made up of standardising agents and/or auxiliaries, such as, for example, dispersants, wetting agents, emulsifiers, dedusting agents and the like. The pasty dyestuff preparations which are in the form of aqueous suspensions normally have a dyestuff content of 20 to 50% by weight and a standardising agent and/or auxiliary content of 20 to 30% by weight, the balance being water. The additional auxiliaries in the pasty dyestuff preparations, i.e. besides dispersants, emulsifiers and wetting agents, can be humectants, such as, for example, glycols or glycerol, and preservatives or fungicides.

The dyestuff mixtures according to the invention can be prepared by various methods, for example by mixing previously conditioned individual dyestuffs or by mixing unconditioned individual dyestuffs and subsequently or during the mixing conditioning the mixture. The mixing of unconditioned individual dyestuffs is preferably carried out in the presence of dispersants with or without further auxiliaries. This mixing process is advantageously carried out in conjunction with the wet comminution at temperatures of 0° to 190° C. which is to be carried out to condition disperse dyestuffs, advantageously in suitable mills, for example colloid, ball, bead or sand mills or dispersion kneaders, but can also be effected, in particular in the case of previously conditioned individual dyestuffs, by mixing by hand or by stirring into dispersants or dyeing liquors.

In the wet comminution of the dyestuffs the dyestuffs, together with dispersants, are suspended in a liquid medium, preferably in water, and the mixture is subjected to the action of shear forces, and the dyestuff particles originally present are mechanically reduced in size so as to obtain an optimum specific surface area and to keep the sedimentation of the dyestuffs as low as possible. The particle size of the dyestuffs is generally about 0.001 mm.

The dispersants present during the wet comminution can be nonionic or anionic. Examples of nonionic dispersants are reaction products of alkylene oxides, such as, for example, ethylene oxide or propylene oxide with alkylatable compounds, such as, for example, fatty alcohols, fatty acids, phenols, alkylphenols and carboxamides. Examples of anionic dispersants are ligninsulphonates, alkylsulphonates, alkylarylsulphonates, and alkylaryl polyglycol ether sulphates.

The dyestuff dispersions obtained from the wet comminution should be pourable for most purposes and can also contain further auxiliaries, for example those which act as oxidising agents, such as, for example, sodium m-nitrobenzenesulphonate, or fungicides, such as, for example, sodium o-phenylphenolate and sodium pentachlorophenolate.

The dyestuff dispersions thus obtained can very advantageously be used for making up print pastes and dyeing liquors. They offer particular advantages, for example, when used in continuous processes, where the dyestuff concentration of the dyeing liquors has to be kept constant by continuously feeding dyestuff into the running apparatus.

For certain uses it is preferable to employ powder formulations. These powders contain the dyestuff, dispersant and other auxiliaries, such as, for example, wetting, oxidising, preserving and dedusting agents. A method of preparing pulverulent dyestuff formulations comprises stripping the liquid dyestuff dispersions described above of their liquid content, for example by vacuum drying, freeze drying, drying on drum driers or preferably by spray drying.

If the dyestuffs are to be used in textile printing, the required amounts of the dyestuff formulations plus thickeners, for example alkali metal alginates or the like, and, if desired, further additives, such as, for example, carriers, wetting agents and oxidising agents, are kneaded to give print pastes.

A further process for preparing preferred dyestuff mixtures according to the invention which contain or consist of two or more individual dyestuffs of the formula I is characterised in that an amine of the formula V

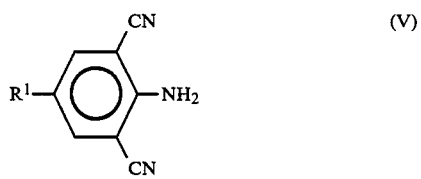

or a mixture of at least two different amines of the formula V is diazotised and coupled onto a coupling component of the formula IV or onto a mixture of at least two different coupling components of the formula IV. The composition of the mixture of the amines and/or the composition of the mixture of the coupling components are chosen so as to produce dyestuff mixtures according to the invention, which are then conventionally conditioned. Preferably, an amine of the formula V is diazotised and coupled onto a mixture of at least two different coupling components of the formula IV. The diazotisation and coupling is carried out in a manner known per se which is customary for preparing individual dyestuffs and which is as described above for the preparation of the individual dyestuffs of the formula I.

In a preferred, further process, the preferred dyestuff mixtures which contain or consist of two or more individual dyestuffs of the formula I can also be prepared by replacing in dyestuff mixtures which consist of at least two dyestuffs of the formula II halogen by cyano in a manner known per se, as described above for the preparation of the individual dyestuffs of the formula I. The composition of the mixture of the dyestuffs of the formula II is chosen so as to produce dyestuff mixtures according to the invention, which are then conventionally conditioned.

Dyestuff mixtures according to the invention can also be prepared by dissolving a mixture of at least two separately prepared, different dyestuffs and crystallising or precipitating them out of the solution. The solution can also be prepared by dissolving the individual dyestuffs separately and combining the individual solutions before the crystallisation or precipitation. Suitable for dissolving the dyestuffs or the dyestuff mixture are for example organic solvents, such as dimethylformamide, dimethyl sulphoxide, chlorobenzene, o-dichlorobenzene, toluene and the like. It is also possible to use mixtures of various solvents. The dissolving is advantageously effected at the boiling temperature of the solvent or solvent mixture. Dyestuff mixtures according to the invention will then crystallise out on cooling down. Instead of by cooling the solution the mixed crystals can also be made to precipitate by adding a solvent in which the dyestuffs are less soluble.

It can be advantageous to finish the dyestuff mixtures or individual dyestuffs according to the invention in a manner known per se in order to convert them into the crystal modification which is most stable at the dyeing temperature. The finishing of the dyestuff mixtures can give rise to mixed crystals. The finishing can be carried out in a conventional manner, for example by heating, either in aqueous suspension after the synthesis or after the conditioning or in the course of the conditioning, advantageously in the presence of finishing aids, emulsifiers and/or solubilisers.

The dyestuff mixtures according to the invention and the individual dyestuffs according to the invention, either alone or mixed with other disperse dyestuffs, are highly suitable for dyeing and printing hydrophobic synthetic fibre materials. The dyestuff mixtures according to the invention, in particular the preferred ones, are surprisingly much superior to the individual dyestuffs known from German Offenlegungsschrift No. 2,935,011 in terms of dyeing properties and coloristic fastness properties, such as, for example, levelling, thermomigration, fastness to heat-setting, water fastness, wash fastness and rub fastness, but in particular in build-up, affinity and heat sensitivity. Moreover, the dyestuff mixtures according to the invention produce very strong dyeings with excellent dyebath exhaustion even at lower dyeing temperatures.

Examples of suitable hydrophobic synthetic materials are secondary cellulose acetate, cellulose triacetate, nylons and especially high molecular weight polyesters, such as, for example, polyethylene glycol terephthalate, and their blends with natural fibres, such as, for example, cotton, regenerated cellulose fibres or wool.

For use in dyeing liquors the required amounts of the dyestuff formulations are diluted with the dyeing medium, preferably water, to such an extent that the liquor ratio for the dyeing ranges from 5:1 to 50:1. The liquors generally have added to them further dyeing auxiliaries, such as dispersants, wetting agents and fixing aids.

The dyestuff mixtures according to the invention and the individual dyestuffs according to the invention are preferably used for dyeing and printing materials made of high molecular weight polyesters, in particular those based on polyethylene glycol terephthalates or their mixtures with natural fibre materials, or for dyeing and printing materials made of cellulose triacetate. These materials can be in the form of, for example, sheetlike or threadlike structures or loose fibre, having been processed, for example, into yarns or woven or knitted textile fabrics. Said fibre material is dyed with the dyestuff mixtures according to the invention and the individual dyestuffs according to the invention in a manner known per se, preferably from aqueous suspensions in the absence or presence of carriers between 80° and about 110° C. using the exhaust method or at 110° to 140° C. in a dyeing autoclave using the HT method, or by the so-called thermofixing method wherein the goods are padded with the dyeing liquor and are then fixed (set) at about 180° to 230° C. Said materials can be printed by printing the materials with print pastes containing dyestuff mixtures according to the invention or individual dyestuffs according to the invention and fixing the dyestuff, if appropriate in the presence of a carrier, by treating the materials at temperatures between 110° and 230° C. with HT steam, saturated steam or dry heat. This produces very strong red dyeings and prints having very good fastness properties, in particular a very good light fastness and a very good dry heat pleating and setting fastness.

Their high tinctorial strength and excellent dyeing properties make the individual dyestuffs according to the invention and in particular the dyestuff mixtures according to the invention excellent alternatives to the more costly anthraquinoid disperse dyestuffs of the C.I. Disperse Red 60 type and, therefore, can replace all or some of these dyestuffs.

Compared with the individual dyestuffs known from German Offenlegungsschrift No. 2,935,011, the dyestuff mixtures according to the invention can be HT-dyed to the same or better coloristic effect at a lower temperature, for example 120°–125° C. instead of 130° C. Furthermore, the dyebath exhaustion is much better with the dyestuff mixtures according to the invention. It was also surprising that the dyestuff mixtures according to the invention have better build-up and affinity when dyeing with carriers.

The dyestuff mixtures according to the invention produce superior dyeing on secondary cellulose acetate, cellulose triacetate and nylons than the known individual dyestuffs of German Offenlegungsschrift No. 2,935,011 do.

If the textile materials to be dyed or printed contain, in addition to said hydrophobic synthetic fibres, also natural fibres, in particular those mentioned above, the dyestuffs according to the invention and the dyestuff mixtures according to the invention can also be used together with other classes of dyestuff, such as, for example, vat, direct or reactive dyestuffs. After the dyestuffs have been applied to the textile material they are then fixed in a manner known per se either simultaneously or in succession.

The dyestuffs according to the invention and the dyestuff mixtures according to the invention are also suitable for dyeing the hydrophobic materials mentioned above from organic solvents and for mass-colouring.

The dyestuffs according to the invention and the dyestuff mixtures according to the invention are also suitable for colouring organic solvents, mineral oil products, waxes, oils, fats, plastics and surface coatings, since, in these media, they are readily soluble and have high tinctorial strength and good fastness properties, in particular good light fastness.

Examples of organic solvents which can be coloured are alcohols, such as, for example, ethanol, esters, such as, for example, ethyl acetate, ketones, such as, for example, acetone, glycols and glycol ethers, such as, for example, methylglycol and butyldiglycol, and aromatic hydrocarbons, such as, for example, toluene or xylenes. Examples of products which contain the above-mentioned substrates and which accordingly can be coloured with the dyestuff mixtures according to the invention or with the individual dyestuffs according to the invention are printing inks, writing inks, and lacquers, such as, for example, transparent lacquers for flexographic printing. Examples of mineral oil products which can be coloured are diesel and fuel oils. Examples of plastics which can be mass-coloured are polyvinyl chloride, styrene-butadiene mixtures, acrylonitrile-butadiene mixtures but in particular polyolefines, such as polyethylene, polypropylene and preferably polystyrene. Mass-colouring of said plastics in a manner known per se produces colourations of high strength and excellent fastness properties, in particular excellent light and weathering fastness.

The organic solvents, mineral oil products, waxes, oils, fats, plastics and surface coatings are coloured with the dyestuff mixtures according to the invention or the individual dyestuffs according to the invention by mixing said materials in the liquid, molten or thermoplastic state, for example at temperatures of 0° to 250° C., preferably 10° to 240° C., with the dyestuffs, and the dyestuff(s) dissolve(s) rapidly to produce a coloured substrate within a few seconds to minutes.

The following embodiments illustrate the preparation of the dyestuffs and dyestuff mixtures according to the invention and their possible uses. The percentages are by weight.

EXAMPLE 1

(a) 8.5 g of sodium cyanide and 28 g of copper(I) cyanide are added in succession at 70° to 75° C. to 200 ml of dimethyl sulphoxide, and the mixture is stirred for ½ hour. 104.8 g of the dibromo-precursor of the formula II in which X and Hal each denote bromine, $R^1$ denotes ethyl, $R^2$ denotes n-propyl, $R^3$ denotes methyl and $R^4$ denotes ethyl are then added at the same temperature, and the batch is heated to 110°–112° C., is slowly cooled down and is filtered at 30° C. Washing with 50 ml of dimethyl sulphoxide, 7.5% strength aqueous ammonia and water and drying to constant weight produces 64 g of the dyestuff of the formula I in which $R^1$ denotes ethyl, $R^2$ denotes n-propyl, $R^3$ denotes methyl and $R^4$ denotes ethyl and which melts at 197° to 199° C. and is a red solution in ethyl acetate.

(b) 0.3 g of the dyestuff thus obtained is bead-milled in the presence of twice the amount of a commercially available ligninsulphonate dispersant until finely dispersed and is then stirred into 2,000 g of water. To the dispersion are added 4.0 g of sodium acetate and 2.0 g of a commercially available naphthalenesulphonic acid/-formaldehyde condensate dispersant, and the mixture is brought to pH 4–5 with acetic acid.

100 g of a polyester fabric based on polyethylene glycol terephthalate are introduced into the dyeing liquor thus obtained and are dyed at 120° C. for ¾ h.

Subsequent rinsing, reduction clearing with a 0.2% strength sodium dithionite solution at pH 10–11 (sodium hydroxide solution) at 70° to 80° C. for 15 minutes, rinsing and drying produces a strong red dyeing having very good coloristic properties.

EXAMPLE 2

(a) Example 1a is repeated, except that the dibromo-precursor mentioned there is replaced by a mixture of 51.0 g of the dibromo-precursor of the formula II in which X and Hal each denote bromine, $R^1$ denotes methyl, $R^2$ denotes n-propyl, $R^3$ denotes methyl and $R^4$ denotes ethyl and 48.2 g of the dibromo-precursor of the formula II in which X and Hal each denote bromine, $R^1$ denotes methyl, $R^2$ denotes methyl and $R^3$ denotes methyl and $R^4$ denotes ethyl, affording 61.0 g of a dyestuff mixture which consists of two individual dyestuffs of the formula I in which the radicals have the following meanings:

Dyestuff 1: $R^1$ methyl, $R^2$ n-propyl, $R^3$ methyl, $R^4$ ethyl;

Dyestuff 2: $R^1$ methyl, $R^2$ methyl, $R^3$ methyl, $R^4$ ethyl.

(b) If a dyeing liquor is prepared as described in Example 1b using 0.15 g of the dyestuff mixture obtained and if 100 g of a polyester fabric based on polyethylene glycol terephthalate are dyed therein at the boil for 1½ hours in the presence of 3 g of a commercially available methylnaphthalene-based carrier, 2 g of a dispersant based on a formaldehyde condensation product, 4 g of anhydrous sodium acetate and 6 g of 30% strength acetic acid and are then finished as described in Example 1, this produces a pink dyeing having good fastness properties.

(c) A dyeing liquor is prepared as described in Example 1b from 0.3 g of the dyestuff mixture obtained in Example 2a and 100 g of polyester fabric based on polyethylene glycol terephthalate are dyed therein at 120° C. for ¾ h and are then finished. The dyeing obtained is denoted A. The remaining dyeing liquor is used to prepare a residual dyebath dyeing by dyeing therein, at 130° C. for 1 hour and finishing, a further 100 g of polyester fabric based on polyethylene glycol terephthalate. The residual dyebath dyeing thus obtained is denoted B. The same thing was done with 0.3 g of the dyestuff known from German Offenlegungsshcrift No. 2,935,011 and having the formula I in which $R^1$ denotes methyl, $R^2$ denotes methyl, $R^4$ denotes methyl and $R^3$ denotes ethyl, and the depth of shade of the resulting dyeings and residual dyebath dyeings was measured. The results, expressed relative to a depth of shade of 100% for dyeing A obtained with the dyestuff mixture according to the invention, were as follows:

|  | Depth of shade of | |
| --- | --- | --- |
|  | Dyeing | Residual dyebath dyeing |
| Dyestuff mixture according to the invention | 100% | 2.2% |
| Individual dyestuff according to German Offenlegungsschrift 2,935,011 | 66.3% | 44.3% |

Clearly, the dyestuff mixture according to the invention not only produces a much stronger dyeing but also has a much better dyebath exhaustion.

EXAMPLE 3

20.1 g of the dyestuff of the formula I in which $R^1$ denotes methyl, $R^2$ denotes n-propyl, $R^3$ denotes methyl and $R^4$ denote ethyl and 20.8 g of the dyestuff of Example 1 are dissolved at 110° C. in 400 ml of dimethylformamide, the solution is slowly cooled down to room temperature, and all of the batch is precipitated with 2,000 ml of water, is filtered off and is washed with water until solvent-free. This produces, on complete drying, 40.9 g of a dyestuff mixture which consists of the two individual dyestuffs and which likewise gives a red solution in ethyl acetate.

This dyestuff mixture, on dyeing as described in Examples 1b or 2b, likewise produces strong bright red or pink dyeings having good fastness properties.

EXAMPLE 4

Joint fine-dispersing in a conventional bead mill turns 5 g of the dyestuff of the formula I in which $R^1$ to $R^4$ all denote methyl, 5 g of the dyestuff of the formula I in which $R^1$, $R^3$ and $R^4$ each denote methyl and $R^2$ denotes n-propyl, 10 g of 100% strengt C.I. Disperse Red 60, 10 g of a commercially available ligninsulphonate-based dispersant and 160 g of water into a conditioned ready-to-use dyestuff preparation which is very rapidly dispersed in aqueous dyeing liquors and print pastes.

Practical application, both in the exhaust method at 98° to 100° C. in the presence of a carrier and in the HT method at 130° C., to a polyester yarn produces, depending on the dyestuff level, a pink dyeing or a strong red dyeing of high brightness of shade and high fastness level.

The dyeing at 98° to 100° C. is carried out in a liquor which contains 2 g of finely dispersed dyestuff preparation, 2 g/l sodium acetate, 3 cm$^3$/l 30% strength acetic acid and 2 g/l (trichlorobenzene-based) carrier. 100 g of polyethylene terephthalate yarn are dyed at 100° C. for 60 minutes in a liquor ratio of 10:1.

The dyeing at 130° C. is carried out in a liquor which contains 1 g of finely dispersed dyestuff preparation, 2 g/l sodium acetate and 3 cm$^3$/l 30% strength acetic acid. 100 g of polyester yarn are dyed at 130° C. for 40 minutes in a liquor ratio of 10:1.

Both the two dyeing methods produce bright strong red dyeings having good fastness properties.

The table below indicates further dyestuffs and dyestuff mixtures according to the invention which, on polyester materials, likewise produce strong red to reddish violet dyeings and prints have likewise very good coloristic properties.

The numbers indicated in the final columns of the following tables have the following meanings:

1 = red
2 = ruby

3 = bluish red
4 = reddish violet
5 = pink.

TABLE I

Individual dyestuffs of the formula I

| $R^1$ | $R^2$ | $R^3$ | $R^4$ | Shade on polyester |
|---|---|---|---|---|
| $C_2H_5$ | $CH_3$ | $CH_3$ | $CH_3$ | 1 |
| $C_2H_5$ | $CH_3$ | $C_2H_5$ | $CH_3$ | 1 |
| $C_2H_5$ | $CH_3$ | $C_2H_5$ | $C_2H_5$ | 1 |
| $C_2H_5$ | $CH_3$ | $CH_3$ | $i\text{-}C_4H_9$ | 1 |
| $C_2H_5$ | $C_2H_5$ | $C_2H_5$ | $CH_3$ | 1 |
| $C_2H_5$ | $C_2H_5$ | $CH_3$ | $i\text{-}C_3H_7$ | 1 |
| $C_2H_5$ | $n\text{-}C_3H_7$ | $CH_3$ | $CH_3$ | 1 |
| $C_2H_5$ | $n\text{-}C_3H_7$ | $C_2H_5$ | $CH_3$ | 1 |
| $C_2H_5$ | $i\text{-}C_3H_7$ | $C_2H_5$ | $CH_3$ | 1 |
| $C_2H_5$ | $i\text{-}C_3H_7$ | $C_2H_5$ | $C_2H_5$ | 1 |
| $i\text{-}C_3H_7$ | $CH_3$ | $C_2H_5$ | $CH_3$ | 1 |
| $i\text{-}C_3H_7$ | $C_2H_5$ | $C_2H_5$ | $CH_3$ | 1 |
| $i\text{-}C_3H_7$ | $n\text{-}C_3H_7$ | $CH_3$ | $CH_3$ | 1 |
| $n\text{-}C_3H_7$ | $CH_3$ | $C_2H_5$ | $C_2H_5$ | 1 |
| $n\text{-}C_3H_7$ | $C_2H_5$ | $C_2H_5$ | $CH_3$ | 1 |
| $sec\text{-}C_4H_9$ | $CH_3$ | $CH_3$ | $CH_3$ | 1 |
| $sec\text{-}C_4H_9$ | $C_2H_5$ | $CH_3$ | $tert\text{-}C_4H_9$ | 1 |
| $tert\text{-}C_4H_9$ | $CH_3$ | $C_2H_5$ | $CH_3$ | 1 |
| $C_5H_{11}$ | $CH_3$ | $C_2H_5$ | $C_2H_5$ | 1 |
| $C_6H_{11}$ | $C_2H_5$ | $C_2H_5$ | $CH_3$ | 1 |
| F | $CH_3$ | $CH_3$ | $C_2H_5$ | 2 |
| F | $CH_3$ | $C_2H_5$ | $i\text{-}C_3H_7$ | 2 |
| F | $C_2H_5$ | $C_2H_5$ | $C_2H_5$ | 2 |
| F | $C_2H_5$ | $CH_3$ | $n\text{-}C_3H_7$ | 2 |
| F | $n\text{-}C_3H_7$ | $CH_3$ | $CH_3$ | 2 |
| F | $n\text{-}C_3H_7$ | $C_2H_5$ | $i\text{-}C_3H_7$ | 2 |
| F | $n\text{-}C_3H_7$ | $CH_3$ | $C_2H_5$ | 2 |
| F | $i\text{-}C_3H_7$ | $CH_3$ | $C_2H_5$ | 2 |
| F | $i\text{-}C_3H_7$ | $CH_3$ | $n\text{-}C_4H_9$ | 2 |
| Cl | $CH_3$ | $CH_3$ | $n\text{-}C_3H_7$ | 2 |
| Cl | $C_2H_5$ | $CH_3$ | $C_2H_5$ | 2 |
| Cl | $C_2H_5$ | $C_2H_5$ | $n\text{-}C_3H_7$ | 2 |
| Cl | $C_2H_5$ | $n\text{-}C_3H_7$ | $n\text{-}C_3H_7$ | 2 |
| Cl | $n\text{-}C_3H_7$ | $CH_3$ | $C_2H_5$ | 2 |
| Cl | $n\text{-}C_3H_7$ | $C_2H_5$ | $C_2H_5$ | 2 |
| Cl | $n\text{-}C_3H_7$ | $CH_3$ | $i\text{-}C_4H_9$ | 2 |
| Cl | $n\text{-}C_3H_7$ | $CH_3$ | $n\text{-}C_3H_7$ | 2 |
| Cl | $i\text{-}C_3H_7$ | $CH_3$ | $CH_3$ | 2 |
| Cl | $i\text{-}C_3H_7$ | $CH_3$ | $i\text{-}C_3H_7$ | 2 |
| Cl | $i\text{-}C_3H_7$ | $C_2H_5$ | $i\text{-}C_3H_7$ | 2 |
| Br | $CH_3$ | $C_2H_5$ | $C_2H_5$ | 2 |
| Br | $C_2H_5$ | $CH_3$ | $C_2H_5$ | 2 |
| Br | $C_2H_5$ | $CH_3$ | $tert\text{-}C_4H_9$ | 2 |
| Br | $C_2H_5$ | $n\text{-}C_3H_7$ | $n\text{-}C_3H_7$ | 2 |
| Br | $n\text{-}C_3H_7$ | $CH_3$ | $CH_3$ | 2 |
| Br | $n\text{-}C_3H_7$ | $CH_3$ | $C_2H_5$ | 2 |
| Br | $n\text{-}C_3H_7$ | $CH_3$ | $n\text{-}C_3H_7$ | 2 |
| Br | $n\text{-}C_3H_7$ | $C_2H_5$ | $C_2H_5$ | 2 |
| Br | $i\text{-}C_3H_7$ | $C_2H_5$ | $C_2H_5$ | 2 |
| Br | $i\text{-}C_3H_7$ | $CH_3$ | $i\text{-}C_3H_7$ | 2 |
| Br | $i\text{-}C_3H_7$ | $CH_3$ | $n\text{-}C_4H_9$ | 2 |
| $CH_3O$ | $CH_3$ | $C_2H_5$ | $i\text{-}C_3H_7$ | 3 |
| $CH_3O$ | $C_2H_5$ | $C_2H_5$ | $C_2H_5$ | 3 |
| $CH_3O$ | $C_2H_5$ | $CH_3$ | $n\text{-}C_3H_7$ | 3 |
| $CH_3O$ | $n\text{-}C_3H_7$ | $CH_3$ | $C_2H_5$ | 3 |
| $CH_3O$ | $n\text{-}C_3H_7$ | $CH_3$ | $i\text{-}C_3H_7$ | 3 |
| $CH_3O$ | $n\text{-}C_3H_7$ | $C_2H_5$ | $i\text{-}C_3H_7$ | 3 |
| $CH_3O$ | $n\text{-}C_3H_7$ | $C_2H_5$ | $C_2H_5$ | 3 |
| $CH_3O$ | $i\text{-}C_3H_7$ | $CH_3$ | $CH_3$ | 3 |
| $CH_3O$ | $i\text{-}C_3H_7$ | $CH_3$ | $n\text{-}C_3H_7$ | 3 |
| $CH_3O$ | $i\text{-}C_3H_7$ | $C_2H_5$ | $n\text{-}C_3H_7$ | 3 |
| $CH_3CH_2O$ | $CH_3$ | $C_2H_5$ | $C_2H_5$ | 3 |
| $CH_3CH_2O$ | $C_2H_5$ | $CH_3$ | $C_2H_5$ | 3 |
| $CH_3CH_2O$ | $n\text{-}C_3H_7$ | $C_2H_5$ | $C_2H_5$ | 3 |
| $CH_3CH_2O$ | $n\text{-}C_3H_7$ | $CH_3$ | $C_2H_5$ | 3 |
| $i\text{-}C_3H_7O$ | $C_2H_5$ | $CH_3$ | $C_2H_5$ | 3 |
| $i\text{-}C_3H_7O$ | $n\text{-}C_3H_7$ | $C_2H_5$ | $C_2H_5$ | 3 |
| $n\text{-}C_3H_7O$ | $n\text{-}C_3H_7$ | $CH_3$ | $CH_3$ | 3 |
| $n\text{-}C_3H_7O$ | $i\text{-}C_3H_7$ | $CH_3$ | $n\text{-}C_4H_9$ | 3 |
| $n\text{-}C_4H_9O$ | $C_2H_5$ | $n\text{-}H_4H_9$ | $n\text{-}H_4H_9$ | 3 |
| $sec\text{-}C_4H_9O$ | $CH_3$ | $CH_3$ | $i\text{-}C_3H_7$ | 3 |
| $CF_3$ | $CH_3$ | $C_2H_5$ | $C_2H_5$ | 4 |
| $CF_3$ | $C_2H_5$ | $CH_3$ | $C_2H_5$ | 4 |
| $CF_3$ | $n\text{-}C_3H_7$ | $CH_3$ | $CH_3$ | 4 |
| $CF_3$ | $n\text{-}C_3H_7$ | $CH_3$ | $C_2H_5$ | 4 |
| $CF_3$ | $n\text{-}C_3H_7$ | $CH_3$ | $n\text{-}C_3H_7$ | 4 |
| $CF_3$ | $i\text{-}C_3H_7$ | $CH_3$ | $C_2H_5$ | 4 |

TABLE II

Dyestuff mixtures of individual dyestuffs of the formula I. The penultimate column indicates the mixing ratio in % by weight.

| $R^1$ | $R^2$ | $R^3$ | $R^4$ | % by weight | Shade on polyester |
|---|---|---|---|---|---|
| $CH_3$ | $CH_3$ | $CH_3$ | $CH_3$ | 30 | 1 |
| $CH_3$ | $C_2H_5$ | $CH_3$ | $CH_3$ | 70 | |
| $CH_3$ | $CH_3$ | $CH_3$ | $CH_3$ | 40 | 1 |
| $CH_3$ | $n\text{-}C_3H_7$ | $CH_3$ | $CH_3$ | 60 | |
| $CH_3$ | $CH_3$ | $CH_3$ | $C_2H_5$ | 30 | 1 |
| $CH_3$ | $n\text{-}C_3H_7$ | $CH_3$ | $C_2H_5$ | 70 | |
| $CH_3$ | $CH_3$ | $CH_3$ | $C_2H_5$ | 50 | 1 |
| $CH_3$ | $i\text{-}C_3H_7$ | $CH_3$ | $C_2H_5$ | 50 | |
| $CH_3$ | $CH_3$ | $C_2H_5$ | $C_2H_5$ | 15 | 1 |
| $CH_3$ | $C_2H_5$ | $C_2H_5$ | $C_2H_5$ | 30 | |
| $CH_3$ | $n\text{-}C_3H_7$ | $C_2H_5$ | $C_2H_5$ | 55 | |
| $CH_3$ | $CH_3$ | $CH_3$ | $n\text{-}C_3H_7$ | 50 | 1 |
| $CH_3$ | $n\text{-}C_3H_7$ | $CH_3$ | $n\text{-}C_3H_7$ | 50 | |
| $CH_3$ | $C_2H_5$ | $CH_3$ | $CH_3$ | 40 | 1 |
| $CH_3$ | $n\text{-}C_3H_7$ | $CH_3$ | $CH_3$ | 60 | |
| $CH_3$ | $C_2H_5$ | $CH_3$ | $C_2H_5$ | 50 | 1 |
| $CH_3$ | $n\text{-}C_3H_7$ | $CH_3$ | $C_2H_5$ | 50 | |
| $CH_3$ | $C_2H_5$ | $C_2H_5$ | $C_2H_5$ | 50 | 1 |
| $CH_3$ | $n\text{-}C_3H_7$ | $C_2H_5$ | $C_2H_5$ | 50 | |
| $CH_3$ | $C_2H_5$ | $CH_3$ | $i\text{-}C_3H_7$ | 70 | 1 |
| $CH_3$ | $i\text{-}C_3H_7$ | $CH_3$ | $i\text{-}C_3H_7$ | 30 | |
| $CH_3$ | $n\text{-}C_3H_7$ | $CH_3$ | $C_2H_5$ | 50 | 1 |
| $CH_3$ | $i\text{-}C_3H_7$ | $CH_3$ | $C_2H_5$ | 40 | |
| $CH_3$ | $i\text{-}C_3H_7$ | $CH_3$ | $CH_3$ | 10 | |
| $CH_3$ | $n\text{-}C_3H_7$ | $C_2H_5$ | $C_2H_5$ | 35 | 1 |
| $CH_3$ | $i\text{-}C_3H_7$ | $C_2H_5$ | $C_2H_5$ | 65 | |
| $CH_3$ | $n\text{-}C_3H_7$ | $CH_3$ | $CH_3$ | 45 | 1 |
| $CH_3$ | $i\text{-}C_3H_7$ | $CH_3$ | $CH_3$ | 55 | |
| $C_2H_5$ | $CH_3$ | $CH_3$ | $n\text{-}C_3H_7$ | 40 | 1 |
| $C_2H_5$ | $CH_3$ | $CH_3$ | $n\text{-}C_3H_7$ | 60 | |
| $C_2H_5$ | $CH_3$ | $CH_3$ | $CH_3$ | 60 | 1 |
| $C_2H_5$ | $n\text{-}C_3H_7$ | $CH_3$ | $CH_3$ | 30 | |
| $CH_3$ | $n\text{-}C_3H_7$ | $CH_3$ | $CH_3$ | 10 | |
| $C_2H_5$ | $CH_3$ | $CH_3$ | $CH_3$ | 50 | 1 |
| $C_2H_5$ | $n\text{-}C_3H_7$ | $CH_3$ | $CH_3$ | 50 | |
| $C_2H_5$ | $n\text{-}C_3H_7$ | $CH_3$ | $C_2H_5$ | 50 | 1 |
| $C_2H_5$ | $i\text{-}C_3H_7$ | $CH_3$ | $C_2H_5$ | 50 | |
| $n\text{-}C_3H_7$ | $CH_3$ | $CH_3$ | $CH_3$ | 80 | 1 |
| $n\text{-}C_3H_7$ | $i\text{-}C_3H_7$ | $CH_3$ | $CH_3$ | 20 | |
| $i\text{-}C_3H_7$ | $CH_3$ | $C_2H_5$ | $C_2H_5$ | 30 | 1 |
| $i\text{-}C_3H_7$ | $C_2H_5$ | $C_2H_5$ | $C_2H_5$ | 60 | |
| $CH_3$ | $CH_3$ | $CH_3$ | $CH_3$ | 10 | |
| $CH_3$ | $CH_3$ | $C_2H_5$ | $C_2H_5$ | 35 | 1 |
| $C_2H_5$ | $CH_3$ | $C_2H_5$ | $C_2H_5$ | 65 | |
| $CH_3$ | $n\text{-}C_3H_7$ | $CH_3$ | $n\text{-}C_3H_7$ | 15 | 1 |
| $C_2H_5$ | $C_2H_5$ | $CH_3$ | $n\text{-}C_3H_7$ | 85 | |
| $CH_3$ | $C_2H_5$ | $CH_3$ | $C_2H_5$ | 50 | 1 |
| $C_2H_5$ | $C_2H_5$ | $CH_3$ | $C_2H_5$ | 50 | |
| $CH_3$ | $C_2H_5$ | $C_2H_5$ | $C_2H_5$ | 60 | 1 |
| $i\text{-}C_3H_7$ | $CH_3$ | $C_2H_5$ | $C_2H_5$ | 40 | |
| $CH_3$ | $n\text{-}C_3H_7$ | $CH_3$ | $i\text{-}C_3H_7$ | 10 | 1 |

TABLE I-continued

Individual dyestuffs of the formula I

| $R^1$ | $R^2$ | $R^3$ | $R^4$ | Shade on polyester |
|---|---|---|---|---|
| $CF_3$ | $i\text{-}C_3H_7$ | $CH_3$ | $C_2H_5$ | 4 |

TABLE II-continued

Dyestuff mixtures of individual dyestuffs of the formula I.
The penultimate column indicates the mixing ratio in % by weight.

| $R^1$ | $R^2$ | $R^3$ | $R^4$ | % by weight | Shade on polyester |
|---|---|---|---|---|---|
| i-$C_3H_7$ | $C_2H_5$ | $CH_3$ | i-$C_3H_7$ | 90 | |
| $CH_3$ | n-$C_3H_7$ | $CH_3$ | $C_2H_5$ | 70 | 1 |
| n-$C_3H_7$ | n-$C_3H_7$ | $CH_3$ | $CH_3$ | 30 | |
| $CH_3$ | $CH_3$ | $CH_3$ | $CH_3$ | 50 | 1 |
| $CH_3$ | $CH_3$ | $C_2H_5$ | $C_2H_5$ | 50 | |
| $CH_3$ | $C_2H_5$ | $CH_3$ | $CH_3$ | 40 | 1 |
| $CH_3$ | $C_2H_5$ | $CH_3$ | $C_2H_5$ | 60 | |
| $CH_3$ | i-$C_3H_7$ | $CH_3$ | n-$C_3H_7$ | 50 | 1 |
| $CH_3$ | i-$C_3H_7$ | $CH_3$ | $C_2H_5$ | 50 | |
| $CH_3$ | n-$C_3H_7$ | $CH_3$ | $CH_3$ | 50 | 1 |
| $CH_3$ | n-$C_3H_7$ | $CH_3$ | $C_2H_5$ | 50 | |
| $C_2H_5$ | $C_2H_5$ | $C_2H_5$ | $C_2H_5$ | 25 | 1 |
| $C_2H_5$ | $C_2H_5$ | $C_2H_5$ | i-$C_3H_7$ | 25 | |
| $CH_3$ | n-$C_3H_7$ | $C_2H_5$ | $C_2H_5$ | 50 | |
| Cl | $CH_3$ | $CH_3$ | n-$C_3H_7$ | 65 | 2 |
| Cl | n-$C_3H_7$ | $CH_3$ | n-$C_3H_7$ | 35 | |
| Cl | $C_2H_5$ | $CH_3$ | $CH_3$ | 40 | 2 |
| Cl | i-$C_3H_7$ | $CH_3$ | $CH_3$ | 60 | |
| Br | $CH_3$ | $C_2H_5$ | $C_2H_5$ | 65 | 2 |
| Br | n-$C_3H_7$ | $C_2H_5$ | $C_2H_5$ | 35 | |
| Br | $CH_3$ | $CH_3$ | $C_2H_5$ | 10 | 2 |
| Br | $C_2H_5$ | $CH_3$ | $C_2H_5$ | 20 | |
| Br | n-$C_3H_7$ | $CH_3$ | $CH_3$ | 70 | |
| Br | n-$C_3H_7$ | $CH_3$ | i-$C_3H_7$ | 45 | 2 |
| Br | i-$C_3H_7$ | $CH_3$ | i-$C_3H_7$ | 55 | |
| $CH_3O$ | $CH_3$ | n-$C_3H_7$ | n-$C_3H_7$ | 50 | 2 |
| $CH_3O$ | $C_2H_5$ | n-$C_3H_7$ | n-$C_3H_7$ | 50 | |
| $CH_3O$ | $C_2H_5$ | $CH_3$ | n-$C_3H_7$ | 60 | 2 |
| $CH_3O$ | n-$C_3H_7$ | $CH_3$ | $C_2H_5$ | 40 | |
| $CH_3O$ | n-$C_3H_7$ | $C_2H_5$ | $C_2H_5$ | 30 | 2 |
| $CH_3O$ | i-$C_3H_7$ | $C_2H_5$ | $C_2H_5$ | 30 | |
| $CH_3O$ | n-$C_3H_7$ | $CH_3$ | $CH_3$ | 40 | |
| $C_2H_5O$ | $C_2H_5$ | $CH_3$ | $CH_3$ | 35 | 2 |
| $C_2H_5O$ | i-$C_3H_7$ | $CH_3$ | $CH_3$ | 65 | |
| $C_2H_5O$ | $CH_3$ | n-$C_3H_7$ | n-$C_3H_7$ | 45 | 2 |
| $C_2H_5O$ | i-$C_3H_7$ | $C_2H_5$ | $C_2H_5$ | 55 | |
| n-$H_4H_9O$ | $CH_3$ | $CH_3$ | $C_2H_5$ | 55 | 2 |
| n-$H_4H_9O$ | $C_2H_5$ | $C_2H_5$ | $C_2H_5$ | 45 | |
| $CF_3$ | $C_2H_5$ | $CH_3$ | n-$C_3H_7$ | 60 | 2 |
| $CF_3$ | n-$C_3H_7$ | $CH_3$ | n-$C_3H_7$ | 40 | |
| $CF_3$ | $C_2H_5$ | $C_2H_5$ | $C_2H_5$ | 40 | 2 |
| $CF_3$ | i-$C_3H_7$ | $C_2H_5$ | $C_2H_5$ | 60 | |
| $CH_3$ | n-$C_3H_7$ | $C_2H_5$ | $C_2H_5$ | 65 | 5 |
| $CF_3$ | n-$C_3H_7$ | $C_2H_5$ | $C_2H_5$ | 35 | |
| $CH_3$ | n-$C_3H_7$ | $CH_3$ | n-$C_3H_7$ | 60 | 5 |
| $CF_3$ | i-$C_3H_7$ | $CH_3$ | n-$C_3H_7$ | 40 | |
| $CH_3$ | n-$C_3H_7$ | $CH_3$ | $C_2H_5$ | 55 | 5 |
| $CF_3$ | n-$C_3H_7$ | $CH_3$ | n-$C_3H_7$ | 45 | |
| $CH_3$ | $C_2H_5$ | $C_2H_5$ | i-$C_3H_7$ | 70 | 5 |
| $CF_3$ | n-$C_3H_7$ | $C_2H_5$ | i-$C_3H_7$ | 30 | |
| $C_2H_5$ | $C_2H_5$ | $CH_3$ | $CH_3$ | 40 | 5 |
| $CF_3$ | n-$C_3H_7$ | $CH_3$ | $C_2H_5$ | 60 | |
| $CH_3$ | $C_2H_5$ | $C_2H_5$ | $C_2H_5$ | 50 | 3 |
| $OCH_3$ | $C_2H_5$ | $C_2H_5$ | $C_2H_5$ | 50 | |
| $CH_3$ | n-$C_3H_7$ | $CH_3$ | $C_2H_5$ | 50 | 3 |
| $OCH_3$ | i-$C_3H_7$ | $CH_3$ | $C_2H_5$ | 50 | |
| $CH_3$ | n-$C_3H_7$ | $CH_3$ | n-$H_4H_9$ | 80 | 3 |
| $OC_2H_5$ | $CH_3$ | n-$H_4H_9$ | n-$H_4H_9$ | 20 | |
| $CH_3$ | $C_2H_5$ | $C_2H_5$ | $C_2H_5$ | 50 | 2 |
| Cl | $C_2H_5$ | $C_2H_5$ | $C_2H_5$ | 50 | |
| $CH_3$ | $C_2H_5$ | $CH_3$ | $C_2H_5$ | 30 | 2 |
| Cl | n-$C_3H_7$ | $CH_3$ | $C_2H_5$ | 70 | |
| $CH_3$ | i-$C_3H_7$ | $CH_3$ | $C_2H_5$ | 40 | 2 |
| Br | i-$C_3H_7$ | $CH_3$ | i-$C_3H_7$ | 60 | |
| $CH_3$ | $CH_3$ | $CH_3$ | $CH_3$ | 50 | 2 |
| Br | $C_2H_5$ | $C_2H_5$ | $C_2H_5$ | 50 | |
| $CH_3$ | $C_2H_5$ | $CH_3$ | $C_2H_5$ | 30 | 3 |
| F | n-$C_3H_7$ | $CH_3$ | $C_2H_5$ | 70 | |

What is claimed is:

1. A mixture of monoazo dyestuffs comprising at least two different dyestuffs of the formula

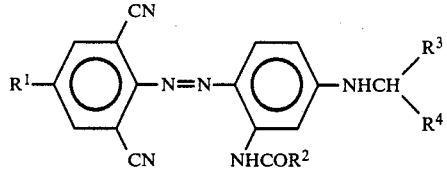

wherein $R^1$ is alkyl of 1 to 6 carbon atoms, cyclopentyl, cyclohexyl, fluoro, chloro, bromo, alkoxy of 1 to 4 carbon atoms or trifluoromethyl, $R^2$ is alkyl of 1 to 3 carbon atoms and $R^3$ and $R^4$, independently of each other, are alkyl of 1 to 4 carbon atoms.

2. A dyestuff mixture according to claim 1 wherein the weight proportion of one individual dyestuff of said formula is 10 to 90%.

3. A dyestuff mixture according to claim 2 wherein the weight proportion of one individual dyestuff of said formula is 30 to 70%.

4. A dyestuff mixture according to claim 1 containing two different dyestuffs of said formula.

5. A dyestuff mixture according to claim 1 wherein $R^3$ is methyl or ethyl.

6. A dyestuff mixture according to claim 1 wherein $R^4$ is alkyl of 1 to 3 carbon atoms.

7. A dyestuff mixture according to claim 1 wherein $R^1$ is alkyl of 1 to 3 carbon atoms, trifluoromethyl, chlorine, bromine, methoxy or ethoxy.

8. A dyestuff mixture according to claim 1 wherein $R^1$ is methyl.

9. A dyestuff mixture according to claim 1 wherein the individual dyestuffs differ at least in the $R^2$ substituent.

10. A dyestuff mixture according to claim 1 containing one dyestuff of said formula wherein $R^2$ is isopropyl.

11. A dyestuff mixture according to claim 1 containing one dyestuff of said formula wherein $R^2$ is n-propyl.

12. The process for preparing dyestuff mixtures according to claim 1 wherein at least two individual dyestuffs of said formula are mixed with each other.

13. The process for preparing dyestuff mixtures according to claim 1 which comprises diazotizing at least one amine of the formula

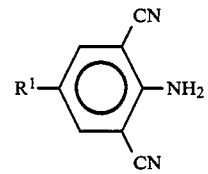

and then coupling the diazotised amine onto a coupling component or a mixture of at least two different coupling components of the formula

14. The process for preparing dyestuff mixtures according to claim 1 which comprises replacing halogen with cyano in a mixture of at least two individual compounds of the formula

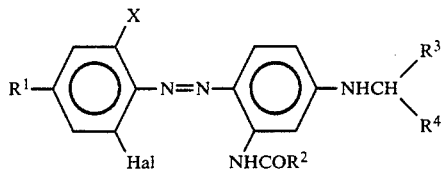

15. In the process for dyeing and printing hydrophobic fiber materials and mixtures thereof with natural fibers or regenerated cellulose fibers by dyeing and printing with an azo dyestuff-containing dyeing liquor or print paste, the improvement comprises said azo dyestuff being a mixture of monoazo dyestuffs comprising at least two different dyestuffs of the formula

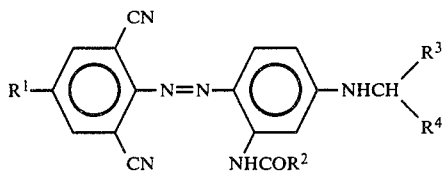

wherein
$R^1$ is alkyl of 1 to 6 carbon atoms, cycllpentyl, cyclohexyl, fluoro, chloro, bromo, alkoxy of 1 to 4 carbon atoms or trifluoromethyl,
$R^2$ is alkyl of 1 to 3 carbon atoms and
$R^3$ and $R^4$, independently of each other, are alkyl of 1 to 4 carbon atoms or an individual monoazo dyestuff of the formula

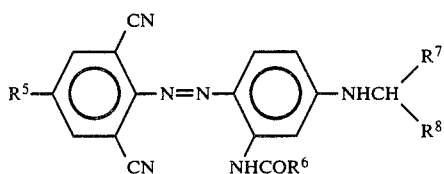

wherein
$R^5$ is alkyl of 2 to 6 carbon atoms, cyclopentyl, cyclohexyl, fluoro, chloro, bromo, alkoxy of 1 to 4 carbon atoms or trifluoromethyl,
$R^6$ is alkyl of 1 to 3 carbon atoms and
$R^7$ and $R^8$, independently of each other, are alkyl of 1 to 4 carbon atoms.

* * * * *